United States Patent
Scuilla et al.

(10) Patent No.: US 6,558,538 B2
(45) Date of Patent: May 6, 2003

(54) DEVICE FOR PREVENTING THE CLOGGING OF A DRAINAGE SYSTEM

(75) Inventors: Vincent Scuilla, Sarasota, FL (US); Peter A. Vandenbergh, Sarasota, FL (US); David E. Glendening, Bradenton, FL (US); Perry T. Patterson, Sarasota, FL (US)

(73) Assignee: Osprey Biotechnics, Inc., Sarasota, FL (US)

( * ) Notice: Subject to any disclaimer, the term of this patent is extended or adjusted under 35 U.S.C. 154(b) by 37 days.

(21) Appl. No.: 09/845,629

(22) Filed: Apr. 30, 2001

(65) Prior Publication Data

US 2002/0158028 A1 Oct. 31, 2002

(51) Int. Cl.[7] .................................................. C02F 1/50
(52) U.S. Cl. ............................ 210/198.1; 4/679; 4/222; 210/484; 222/190; 422/276; 252/176
(58) Field of Search .......................... 4/679, 681, 222, 4/255.01, DIG. 10; 141/364; 210/192, 198.1, 206, 484; 222/190; 252/176; 422/261, 276

(56) References Cited

U.S. PATENT DOCUMENTS

| 644,142 | A | | 2/1900 | Mulherin |
|---|---|---|---|---|
| 3,112,499 | A | | 12/1963 | Thornton |
| 4,416,854 | A | * | 11/1983 | Nielsen ...................... 205/701 |
| 4,810,385 | A | * | 3/1989 | Hater et al. .................. 210/150 |
| 4,817,214 | A | * | 4/1989 | Stuessy .......................... 4/222 |
| 5,004,025 | A | * | 4/1991 | Robbins ...................... 141/364 |
| 5,011,602 | A | * | 4/1991 | Totani et al. ............. 210/242.1 |
| 5,019,346 | A | | 5/1991 | Richter et al. |
| 5,312,624 | A | | 5/1994 | Richter e tal. |
| 5,489,415 | A | | 2/1996 | Van Vlahakis et al. |
| 5,538,629 | A | * | 7/1996 | Blaney et al. ............ 210/198.1 |
| 6,248,234 | B1 | * | 6/2001 | Cline .......................... 210/170 |

* cited by examiner

Primary Examiner—Peter A. Hruskoci
(74) Attorney, Agent, or Firm—Ian C. McLeod

(57) ABSTRACT

The present invention provides a method and device for preventing the formation of deposits in a drainage system (100). The device (10) includes a container (12, 212), connected by a flexible cord (20) to a stopper (22). An antimicrobial composition (24) is placed in the container and the container is inserted into a drain opening (102). The container moves to the bottom of the trap (106) of the drainage system. The container is preferably located at least partially beneath the water or drainage fluid (110) in the bottom of the trap. The cord and stopper prevent the container from moving beyond the trap. The cord and stopper allow for removal of the container from the drainage system, once the composition has been fully dispensed.

9 Claims, 3 Drawing Sheets

DEVICE FOR PREVENTING THE CLOGGING OF A DRAINAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to an apparatus and method for preventing the formation of deposits in a drainage system. In particular, the present invention relates to an apparatus and method wherein a device containing a composition having an antimicrobial compound is positioned in the trap of a drainage system. The device is removable from the drainage system once the antimicrobial compound has been dispensed.

(2) Description of the Related Art

The drainage fluid created by the food industry contains a variety of substances which can create clogs in the associated drainage system. In particular, where sugars and refrigerated water are present in the drainage fluid such as with drainage systems connected to beverage dispensers and ice bins, yeast tends to grow in the trap of the drain where the drain fluid collects. The constant source of water and sugar in the trap creates an ideal environment for yeast to grow. As the yeast grows, it forms long chains or ropes which clog the drainage system.

In the past, the methods for providing antimicrobial compositions into a drain for preventing the formation of deposits involved either pouring a liquid or inserting a solid into the drain opening. However, in drains having a continuous drainage flow, the liquids and solids tended to be moved out of the drain quickly limiting their long term effectiveness.

The related art has shown various devices for dispensing disinfecting and/or deodorizing materials into drains. The devices are placed in, over or adjacent to the entrance of the drain such that the drainage fluid entering the drain flows over the device and thus, the drainage fluid is disinfected and/or deodorized. Illustrative are U.S. Pat. No. 3,112,499 to Thornton; U.S. Pat. No. 5,019,346 and U.S. Pat. No. 5,312,624 to Richter et al and U.S. Pat. No. 5,489,415 to Van Vlahakis et al.

Thornton describes a device for disinfecting and/or deodorizing waste pipes. The device is mounted through the opening in the waste pipe. The device includes a tubular support with an integral head (flange). The disinfecting and/or deodorizing material is in solid form and is located within the tubular support. The integral head rests on the grid adjacent the opening in the waste pipe and prevents the device from completely entering the waste pipe and allows the device to be removed from the waste pipe. The disinfecting and/or deodorizing material is activated by water and other drainage fluid flowing around and through the device into the waste pipe.

The Richter et al patents describe a drain sanitizing article. The article includes a housing having a cavity within which is positioned the chemical sanitizer. A handle is connected to the housing. A tear strip facilitates the removal of a portion of the housing which allows the drainage fluid to contact the chemical sanitizer. The article is placed at the opening of the drain and sanitizes the water entering the drain to reduce food borne diseases.

Van Vlahakis et al describes a dispenser assembly for use in dispensing a urinal block composition. The dispenser assembly is placed in a fluid receptacle in such a manner that the chemical is supported above the normal fluid level. When the fluid level in the fluid receptacle rises, or turbulence in the receptacle is high, this fluid is able to make contact with the exposed undersurface of the urinal block. The fluid-soluble chemicals of the urinal block composition then dissolve in a preselected quantity into the receptacle area.

However, none of the above devices are intended to inhibit the growth of deposits in the drainage system. Further, none of the above devices are intended to be used in the trap of a drainage system to provide for dispensing the material primarily in the trap of the drainage system.

Also of interest is U.S. Pat. No. 644,142 to Mulherin which describes a trap having a receptacle formed at the lower end of the U-shaped trap. The receptacle includes a germicide or disinfecting material. To insert the germicide or disinfecting material, the receptacle is removed from the trap. However, this invention requires modification of the trap of the drainage system. The invention also requires outside access to the trap.

There remains the need for a device which allows an antimicrobial compound to be positioned in the trap of a drainage system to prevent the formation of deposits in the drainage system and which can be easily inserted and removed from the drainage system.

SUMMARY OF THE INVENTION

The present invention provides a method and device for preventing the formation of deposits in a drainage system. The device includes a container, an antimicrobial composition with a flexible cord extending between the container and a stopper. The antimicrobial composition is placed in the container and the container is inserted into an opening of the drainage system adjacent the trap. The container moves through the drainage system to the bottom of the trap. The container is preferably located at least partially beneath the water retained by the trap. The size of the stopper prevents the stopper from entering the opening of the drainage system and prevents the container from moving beyond the trap. The cord and stopper also allow for removal of the container from the drainage system, once the composition has been fully dispensed.

The present invention relates to a device for use in a drainage system having a trap to prevent clogging of the drainage system which comprises: a container having porous walls; a compound located in the container for inhibiting growth of microorganisms in the drainage system which can clog the drainage system; a flexible member connected to the container for removing the container from the drainage system; and a stop means connected to the flexible member to prevent the flexible member from completely entering the drainage system to allow for removal of the container from the drainage system.

Further, the present invention relates to a method for preventing clogging of a drainage system having a trap, which comprises the steps of: providing a device for use in a drainage system to prevent clogging of the drainage system which comprises: a container having porous walls; a compound located in the container for inhibiting growth of microorganisms in the drainage system which can clog the drainage system; a flexible member connected to the container for removing the container from the drainage system; and a stop means connected to the flexible member to prevent the flexible member from completely entering the drainage system to allow for removal of the container from the drainage system; inserting and positioning the container having the composition into the drainage system such that the container is in the trap of the drainage system; and removing the container from the drainage system by grasping the stop means and pulling the container from the drainage system once the composition is no longer effective in preventing the formation of the microorganisms.

The substance and advantages of the present invention will become increasingly apparent by reference to the following drawings and the description.

DESCRIPTION OF THE PREFERRED EMBODIMENTS

Figure 1:
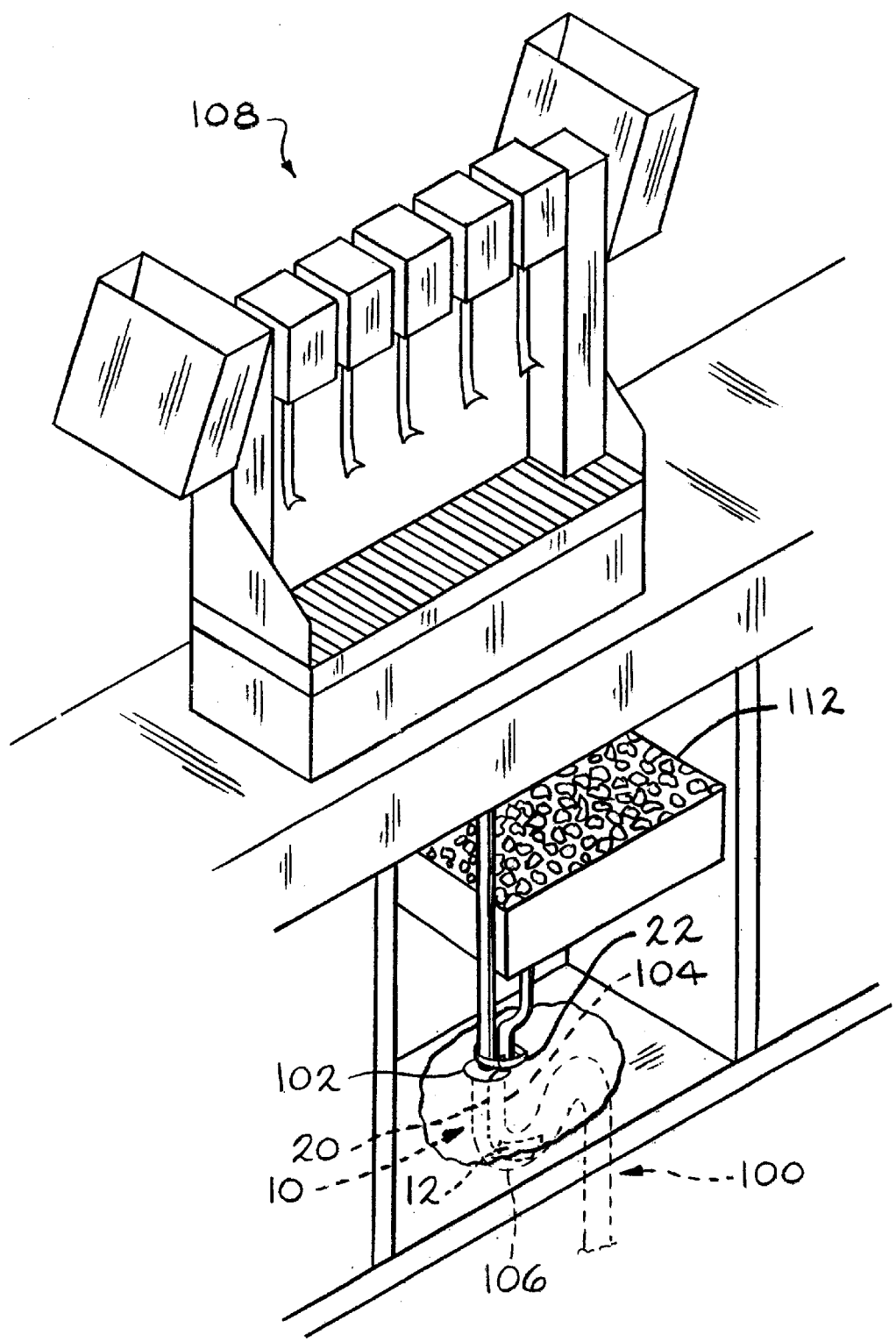
FIG. 1 is a perspective view of a beverage dispensing machine 108 showing the device 10 of the first embodiment positioned in the trap 106 of the drainage system 100.
Figure 2:
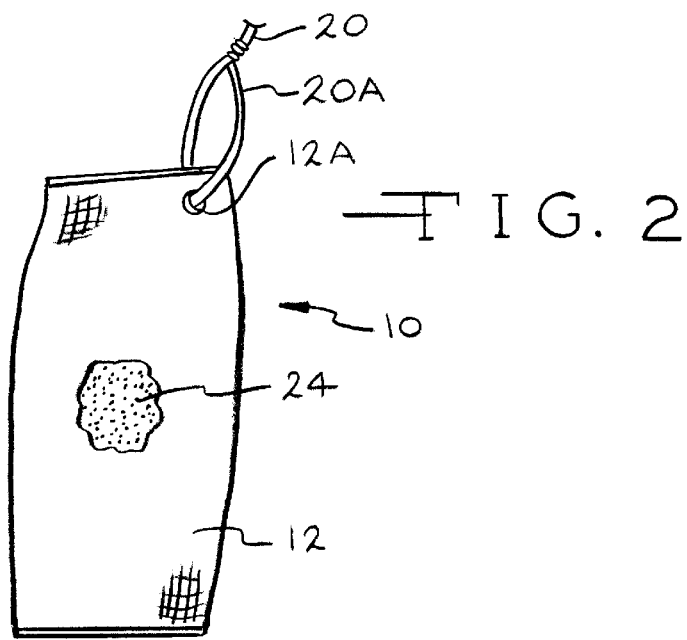
FIG. 2 is a front view of the container 12 of the first embodiment.

The device 10 of the present invention is intended to be used in the trap 106 of a drainage system 100. The drainage system 100 preferably includes a drain opening 102 with a trap 106 directly adjacent the opening 102 of the drainage system 100. In the preferred embodiment, the drain opening 102 is a floor drain which receives drainage fluid 110 from a beverage dispensing machine 108 and preferably condensation from an ice bin 112 (FIG. 1). The device 10 could also be used in an air conditioning run off drain. The device 10 can be used in any drainage system 100 having a low point where the drainage fluid 110 collects such that deposits can grow. The drainage fluid 110 preferably includes sugar and refrigerated or cold water such that yeast can grow. The sugars are preferably a result of the beverages while the refrigerated water can be provided either from melting ice in the beverage dispensing machine 108 or condensation from the ice bin 112 for the beverage dispensing machine 108.

Figure 3:
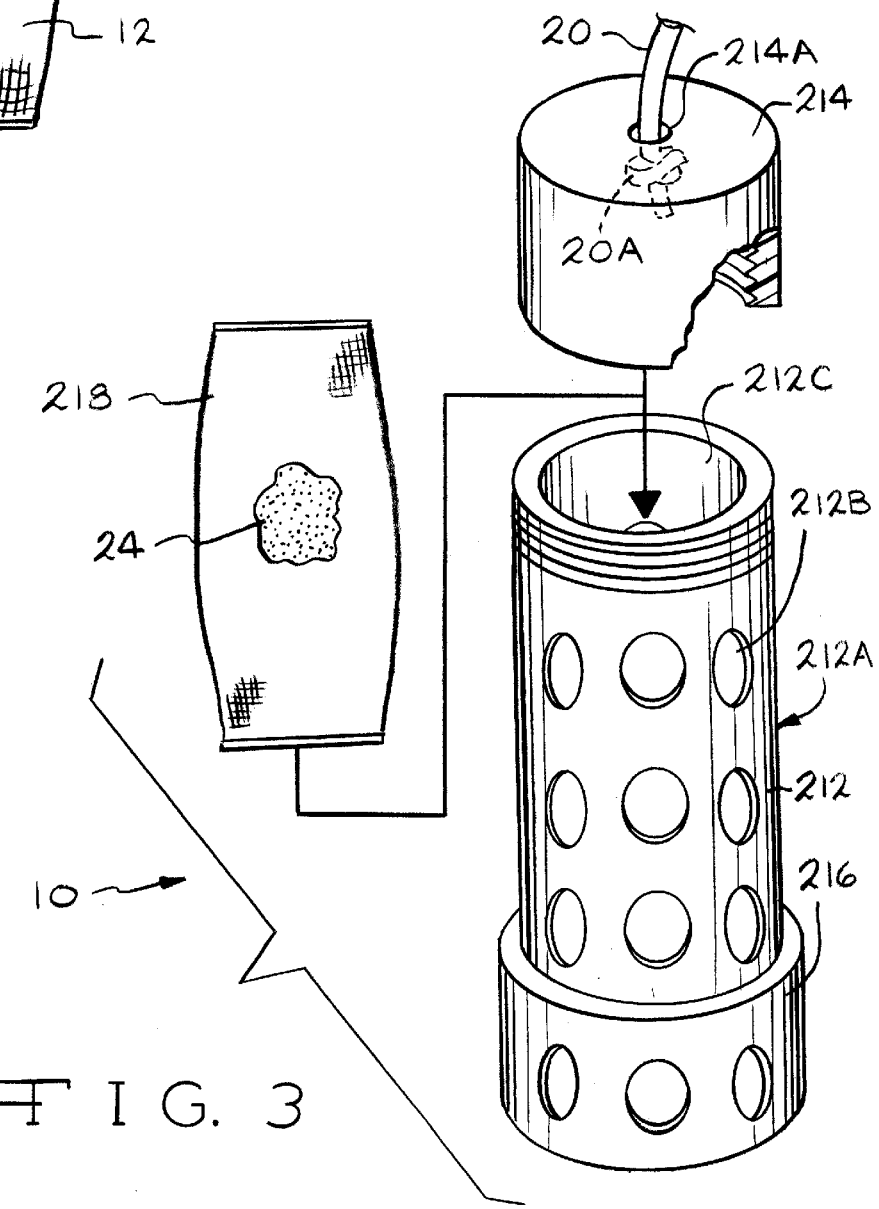
FIG. 3 is a perspective view of the container 212 of the second embodiment showing the package 218 having the composition 24.

The device 10 includes a container 12 or 212, an antimicrobial composition 24, a flexible cord 20 and a stopper 22. In the first embodiment, the container or pouch 12 is constructed of a porous, fabric material which is durable and does not degrade in water or drainage fluid 110. The container 12 is preferably constructed of fine mesh cloth. The composition 24 is inserted into the container 12 and the container 12 is sealed around the perimeter. The container 12 is preferably disposable. The container 12 can be of any size. In the second embodiment, the container 212 has an outer wall 212A forming a hollow, inner chamber 212C. The composition 24 is positioned in the inner chamber 212C of the container 212. The outer wall 212A has openings 212B which allows the drainage fluid 110 to flow into the inner chamber 212C of the container 212 and into contact with the composition 24. The container 212 preferably has top and bottom end caps 214 and 216. At least one (1) of the end caps 214 or 216 is removable to allow for insertion of the composition 24 into the inner chamber 212C of the container 212 (FIG. 3). The outer wall 212A of the container 212 is preferably constructed of a plastic, polymeric material such as PVC which is durable, lightweight and will not degrade in water or the drainage fluid 110. In both embodiments, the size and shape of the container 12 and 212 depends on the size (diameter) of the drainage system 100 and the drain opening 102, the size of the trap 106 and the amount of composition 24 needed to effectively prevent deposit build up in the drainage system 100. However, a rectangular or cylindrical container 12 or 212 is preferred, since it is generally easier to insert into the drain opening 102 and moves easier through the drainage pipes 104 to the trap 106. A rectangular or cylindrical shape also allows for insertion of a larger amount of the composition 24 into the drainage system 100. In both embodiments, the container 12 or 212 holds about 30 grams of the composition 24 for a standard drain. In the second embodiment, the container 212 has a diameter of about 1.0 inches (2.54 cm) and a length of about 4.0 inches (10.2 cm). The composition 24 is preferably in a powder, granular or solid form. In the second embodiment, if the composition 24 is in a powder or granular form, the composition 24 is preferably provided in an inner, porous package or pouch 218. The inner package 218 can be similar to the container 12 of the first embodiment and is preferably constructed of a porous material which will not degrade in the water or drainage fluid 110. The amount of composition 24 and the type of composition 24 used depends on a number of factors including the intended environment of application, i.e. the volume of drain flowage over time, the temperature of the drain flowage, the hardness of the contact water, the specific composition used and the concentration of other constituents (i.e. hardeners). The composition 24 is preferably an antimicrobial composition containing an antimicrobial compound or material. The composition 24 is preferably a slow release composition which is released upon contact with water or other drainage fluid. The composition 24 preferably inhibits the growth of microorganisms in the drainage system 100 and particularly the trap 106. In the preferred embodiment, the composition 24 prevents the growth of yeast in the drainage system 100 caused by sugars and cold water of the drainage fluid 110. Preferably, the composition 24 includes a quaternary ammonium compound having anti-yeast and anti-fungal properties such as the quaternary microbiocide B10-800 which contains 14.6% by weight N-Alkyl($C_{14}$ 50%, $C_{12}$ 40%, $C_{16}$ 10%) dimethylbenzyl ammonium chloride and 21.8% by weight didecyl dimethyl ammonium chloride. However, the composition 24 could include any material or compound which is capable of inhibiting yeast such as chlorine, cycloheximide, potassium sorbate or sodium benzoate.

Figure 4:
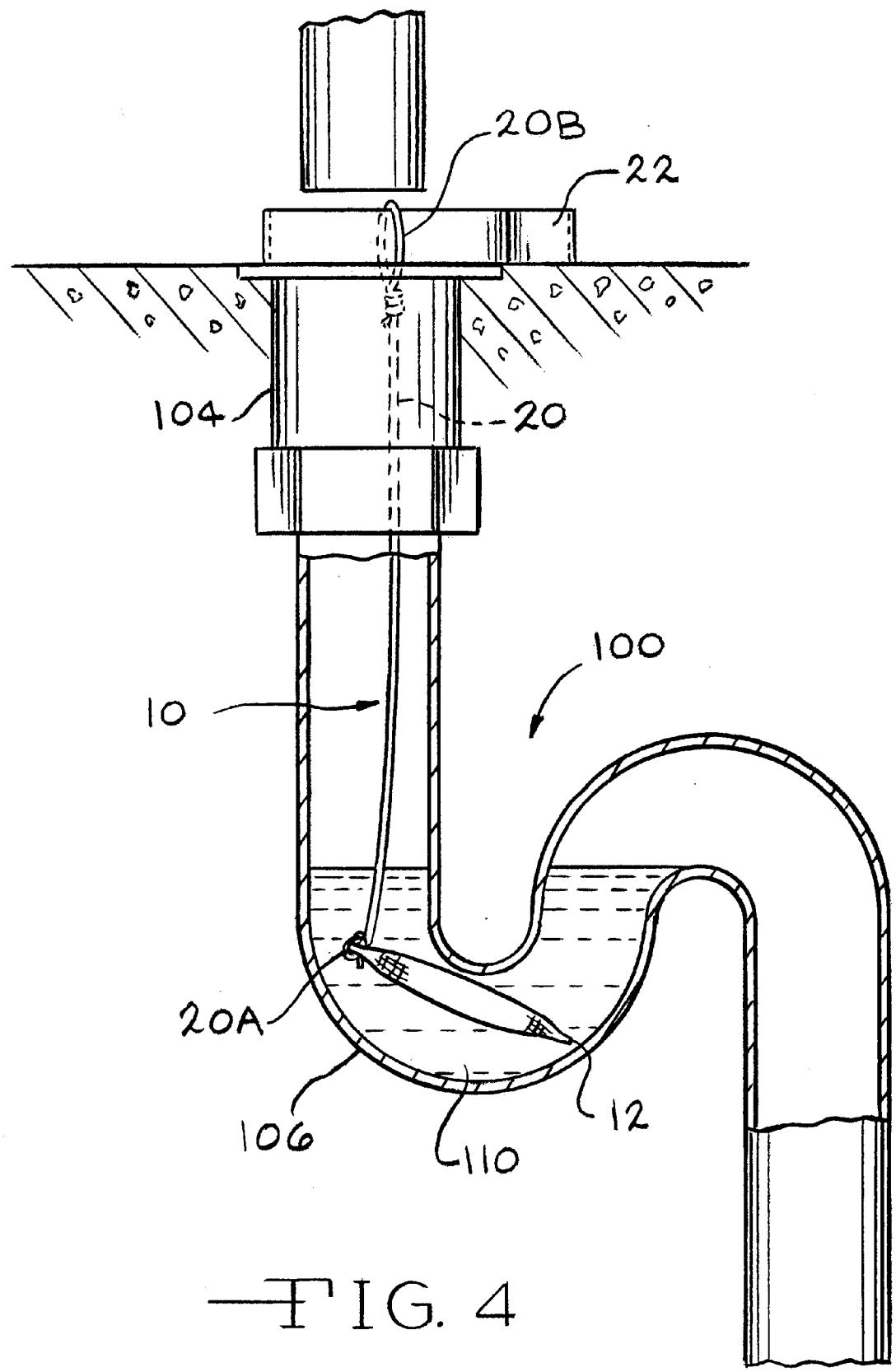
FIG. 4 is a partial cross-sectional view of a trap 106 of a drainage system 100 showing the device 10 of the first embodiment positioned in the trap 106 of the drainage system 100.

The flexible cord 20 has opposed ends 20A and 20B and is attached at one (1) end 20A to one (1) end of the container 12. In the first embodiment, the cord 20 is secured through a hole 12A in the end of the container 12. In the first embodiment, the hole 12A is not in communication with the composition 24. In the second embodiment, the cord 220 is attached through a hole 214A in the top end cap 214 of the container 212. In the preferred embodiment, the cord 20 is attached to the container 12 or 212 such that when the container 12 or 212 is inserted and removed from the drainage system 100, the container 12 or 212 moves essentially along the longitudinal axis of the drain pipe 104. Thus, even if the container 12 or 212 is laying on its side in the trap 106, the cord 20 will easily move the container 12 or 212 into an upright position such that the container 12 or 212 can be easily removed from the trap 106 and the drain pipe 104. The cord 20 is constructed of a durable material which will not degrade in water or other drainage fluid 110. The cord 20 is preferably a plastic coated rope. However, the cord 20 could be constructed of any flexible material such as nylon. The cord 20 could also be a chain. The cord 20 must be flexible such as to move around the curve of the trap 106 into the low point in the trap 106 and to easily pull the container 12 or 212 from the trap 106. The length of the cord 20 depends on the distance from the drain opening 102 to the low point in the trap 106 of the drainage system 100. The length of the cord 20 is such that the container 12 or 212 can be positioned in the water or other drainage fluid 110 in the trap 106 while the opposite end 20B of the cord 20 extends beyond the drain opening 102. Preferably, the container 12 or 212 is positioned in the trap 106 such that the container 12 or 212 is at least partially submerged in the water or other drainage fluid 110 remaining in the trap 106 when the drainage fluid 110 is not flowing and such that the drainage fluid 110 can flow around and through the container 12 or 212 when the drainage fluid 110 is flowing (FIG. 4).

The stopper 22 is provided at the opposite end 20B of the cord 20. The stopper 22 is of a size such that the stopper 22 can not fit into the drain opening 102. In the preferred embodiment, the stopper 22 is a hollow ring having an outer diameter greater than the diameter of the drain opening 102. The center opening of the hollow ring is preferably of such a size as to allow a user to grasp the ring to use the ring as a handle to remove the container 12 or 212 from the drainage system 100.

To use the device 10, a drain cover (not shown), if present, is removed from the drain opening 102. Next, the container 12 or 212 is inserted into the drain opening 102. While the container 12 or 212 is moving down through the drain pipe 104, the user maintains a hold on the stopper 22 and preferably the cord 20. The container 12 or 212 moves downward through the drain pipe 104 until it has reached the bottom or low point of the trap 106. The user then tightens up on the cord 20 and pulls on the cord 20 slightly to ensure that the container 12 or 212 is not resting fully on the bottom of the trap 106 such as to optimize the amount of surface area of the container 12 or 212 which is in contact with the drainage fluid 110 in the trap 106 and flowing through the trap 106 (FIG. 4). In another embodiment, the distance between the drain opening 102 and the trap 106 is predetermined and the cord 20 is either marked to show the depth of entry or is of such a length that when the stopper 22 is adjacent the drain opening 102, the container 12 or 212 is correctly positioned in the trap 106. The container 12 or 212 is positioned in the trap 106 such that the container 12 or 212 and the composition 24 are in contact with the water and other drainage fluid 110 in the trap 106. Preferably, the container 12 or 212 is positioned such that all of the container 12 or 212 is in contact with the water and other drainage fluid 110 in the trap 106. The positioning of the container 12 or 212 in the water and other drainage fluid 110 in the trap 106 allows the composition 24 in the container 12 or 212 to act continuously to inhibit the growth of microorganisms even when the flow of drainage fluid 110 has stopped.

In the preferred embodiment, once the device 10 is correctly positioned in the drainage system 100, the drain cap is replaced on the drain opening 102. The stopper 22 on the end 20B of the cord 20 prevents the cord 20 from completely entering the drain opening 102 and allows for removal of the device 10 from the drainage system 100. Preferably, the cord 20 and stopper 22 do not interfere with the normal operation or normal configuration of the drainage system 100. Once the composition 24 is completely dispensed and is no longer effective, the container 12 or 212 is removed from the drainage system 100. To remove the container 12 or 212, the user removes the drain cap, if present from the drain opening 102. The user then grasps the stopper 22 or the cord 20 extending above the drain opening 102 and pulls upward pulling the container 12 or 212 from the drainage system 100. The flexible nature of the cord 20 allows the container 12 or 212 to be easily removed from the drainage system 100. In the preferred embodiment, a new device 10 or a recharged device 10 is immediately inserted into the drainage system 100. In the first embodiment, the entire old or used device 10 can be discarded and the new device 10 inserted into the drainage system 100. Alternatively, the used container 12 can be removed from the cord 20 and a new container 12 having a full supply of composition 24 can be reattached to the cord 20. This eliminates the need to replace the cord 20 and stopper 22 each time. In the second embodiment, the top or bottom end cap 214 or 216 is removed from the container 212 and the used composition package 218 is removed and a new composition package 218 is inserted and the top or bottom end cap 214 or 216 is reattached. If a solid composition 24 is used, then the new solid composition 24 can be deposited directly in the inner chamber 212C of the container 212.

It is intended that the foregoing description be only illustrative of the present invention and that the present invention be limited only by the hereinafter appended claims.

We claim:

1. A device for use in a drainage system, the drainage system having a trap with liquid in a low point of the trap and having an opening for access to the low point of the trap, to prevent clogging of the drainage system which comprises:

(a) a container having porous walls and configured to be positioned in the liquid in the low point in the trap;

(b) a composition located in the container for inhibiting growth of microorganisms in the drainage system which can clog the drainage system;

(c) a flexible member connected to the container for removing the container from the drainage system and having a length such as to allow the container to be positioned in the low point of the trap; and (d) a stop connected to the flexible member and configured not to extend over the opening of the drainage system and to prevent the flexible member from completely entering the drainage system to allow for removal of the container from the drainage system, the stop being configured such as to not interfere with the opening of the drainage system.

2. The device of claim 1 wherein the container has a cylindrical shape with opposed ends and wherein one of the ends of the container is removable to allow for insertion and removal of the composition.

3. The device of claim 2 wherein the composition is provided in a porous inner container.

4. The device of claim 1 wherein the container is constructed of a porous fabric.

5. The device of claim 1 wherein the flexible member is a cord having opposed ends and connected at one end to the container and connected at the other end to the stop wherein the stop prevents the other end of the cord from entering the opening of the drainage system.

6. The device of claim 1 wherein the stop is a ring having a diameter greater than a diameter of the drainage system.

7. The device of claim 1 wherein the drainage system is a drainage system which receives refrigerated water and sugar for a beverage dispenser and wherein the composition is of the type to prevent formation of yeast.

8. The device of claim 1 wherein the composition includes a quaternary ammonium compound.

9. The device of claim 1 wherein the trap has a bottom forming a part of the low point of the trap, wherein the length of the flexible member is such that only a portion of the container contacts the bottom of the trap when the stop is adjacent the opening of the drainage system.

* * * * *